United States Patent
Himmelmann

(10) Patent No.: US 9,318,937 B2
(45) Date of Patent: Apr. 19, 2016

(54) FLUX CONTROLLED PM ELECTRIC MACHINE ROTOR

(71) Applicant: Hamilton Sundstrand Corporation, Windsor Locks, CT (US)

(72) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 458 days.

(21) Appl. No.: 13/847,578

(22) Filed: Mar. 20, 2013

(65) Prior Publication Data

US 2014/0285053 A1  Sep. 25, 2014

(51) Int. Cl.
*H02K 21/04* (2006.01)
*H02K 19/28* (2006.01)
*H02P 25/28* (2006.01)
*H02P 9/30* (2006.01)
*H02P 9/40* (2006.01)

(52) U.S. Cl.
CPC .............. *H02K 21/042* (2013.01); *H02K 19/28* (2013.01); *H02P 9/302* (2013.01); *H02P 9/40* (2013.01); *H02P 25/28* (2013.01); *H02P 2207/055* (2013.01)

(58) Field of Classification Search
None
See application file for complete search history.

(56) References Cited

U.S. PATENT DOCUMENTS

| | | | | |
|---|---|---|---|---|
| 4,219,739 | A * | 8/1980 | Greenwell | H02K 23/52 290/38 R |
| 6,147,429 | A * | 11/2000 | Akemakou | H02K 21/042 310/156.53 |
| 6,750,628 | B2 * | 6/2004 | Franco | H02K 21/042 318/727 |
| 7,701,104 | B2 * | 4/2010 | Akemakou | H02K 21/042 310/168 |
| 8,922,086 | B2 * | 12/2014 | Reutlinger | 310/181 |
| 2007/0090713 | A1 * | 4/2007 | Arita | H02K 21/042 310/181 |
| 2010/0207480 | A1 * | 8/2010 | Reutlinger | 310/181 |
| 2010/0231181 | A1 * | 9/2010 | Xu | F02B 63/04 322/87 |
| 2012/0187794 | A1 * | 7/2012 | Inoue et al. | 310/181 |
| 2012/0212096 | A1 * | 8/2012 | Minami et al. | 310/181 |

* cited by examiner

*Primary Examiner* — Tran Nguyen
(74) *Attorney, Agent, or Firm* — Kinney & Lange, P.A.

(57) ABSTRACT

A flux-regulated permanent magnet machine (PMM) includes a stationary portion and a rotating portion. The stationary portion includes a plurality of stator/armature windings. The rotating portion includes a plurality of permanent magnets and a control/field winding that is supplied with current to control the magnetic flux presented to the stator/armature windings.

10 Claims, 4 Drawing Sheets

FLUX CONTROLLED PM ELECTRIC MACHINE ROTOR

BACKGROUND

The present invention is related to electric machines, and in particular to electric machines utilizing a flux-regulated permanent magnet rotor.

In the simplest terms, generators convert mechanical energy to electrical energy via the interaction of rotating magnetic fields and coils of wire, wherein motors convert electrical energy to mechanical energy via the interaction of magnetic fields. An electric machine may therefore operate as either a generator or a motor depending on the direction of power flow (e.g., mechanical to electrical or electrical to mechanical). A multitude of electric machine architectures have been developed with various means of providing interaction between magnetic fields and coils of wire. For example, a permanent magnet machine (PMM), operating in a generating mode, utilizes permanent magnets to generate a constant magnetic field, which is rotated via the mechanical energy supplied by a prime mover such that the rotating magnetic field interacts with the stator coils to provide an output voltage. Another type of electric machine, again operating in a generating mode, supplies current through a coil to generate the desired magnetic field on the rotor, which is rotated via the mechanical energy supplied by a prime mover, such that a rotating magnetic field is created that interacts with the stationary stator coils to provide an output voltage.

In the former example, the output voltage supplied by the PMG depends only on the magnitude of the mechanical energy supplied by the prime mover. In the latter example, the output voltage of the generator can be regulated by varying the current supplied to the exciter coil. For applications in which the output voltage must be regulated, the latter example, known as a wound field synchronous machine, is widely utilized. However, permanent magnets offer advantages over excitation provided via an exciter winding, including improved efficiency over more traditional wound field synchronous machines. The key drawback to permanent magnets is that magnetic flux provided by the permanent magnets is constant, unlike an exciter coil in which the magnetic flux can be regulated by increasing or decreasing the current through the exciter coil. Permanent magnets would therefore be useful in a number of generator applications if a form of regulation could be introduced.

SUMMARY

A flux-regulated permanent magnet machine (PMM) includes a stationary portion and a rotating portion. The stationary portion includes a plurality of stator/armature windings. The rotating portion includes a plurality of permanent magnets and a control/field winding that is supplied with current to control the magnetic flux presented to the stator/armature windings.

DETAILED DESCRIPTION

Figure 1:
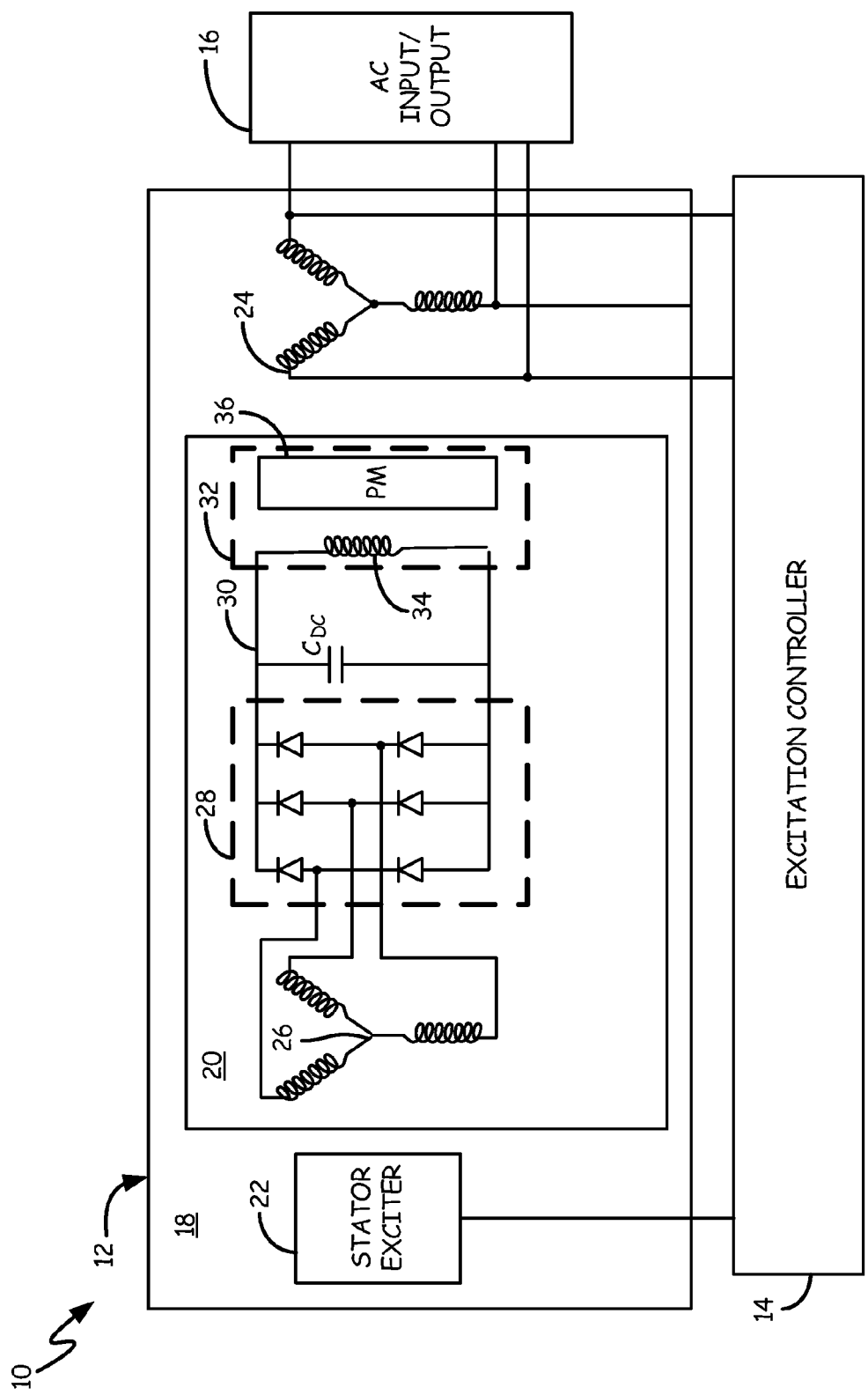
FIG. 1 is a block diagram of an electric machine utilizing a flux-regulated permanent magnet machine (PMM) according to an embodiment of the present invention.

FIG. 1 is a circuit diagram of electric system 10 according to an embodiment of the present invention. System 10 includes permanent magnet machine (PMM) 12, excitation controller 14, and AC input/output 16. PMM 12 is divided into stationary portion 18 and rotating portion 20. Stationary portion 20 includes stator exciter 22 and stator armature windings 24. Rotating portion 20 includes exciter armature windings 26, rotating rectifier 28, DC link 30, DC link capacitor $C_{DC}$ and hybrid permanent magnet (PM) rotor 32, which includes main field winding 34 and main field permanent magnets 36.

PMM 12 may operate in either a generating mode or a motoring mode. In the generating mode, rotational energy supplied to rotating portion 20 is converted to electrical energy provided at main armature windings 24 for supply to AC input/output 16. In the motoring mode, electrical energy supplied by AC input/output 16 to main armature winding 24 creates a rotating magnetic field that interacts with the magnetic field provided by hybrid permanent magnet rotor 32 to generate rotation (i.e., mechanical energy) in rotating portion 20.

Generating Mode

The AC output voltage induced in main armature winding 24 in the generating mode is a function, at least in part, of the magnetic flux provided by hybrid permanent magnet rotor 32 to armature winding 24. Increasing the magnetic flux increases the voltage provided by main armature winding 24, while decreasing the magnetic flux decreases the voltage provided by main armature winding 24. Permanent magnets 36 included as part of hybrid permanent magnet rotor 32 provide a fixed amount of flux. However, the flux that is provided to main armature windings 24 can be increased or decreased by increasing and/or decreasing (depending on the particular configuration of hybrid PM rotor 32) the current through main field winding 34.

Depending on the architecture of PMM 12, the voltage (and therefore the current) provided to main field winding 34 can either be regulated or unregulated. In one embodiment, the voltage provided to main field winding 34 is regulated by regulating the flux provided by stator exciter 22 to exciter armature winding 26, thereby regulating the voltage induced on exciter armature winding 26 and the voltage supplied, via rotating rectifier 28 and DC link bus 30, to main field winding 34. In one embodiment, stator exciter 22 is implemented with a stator exciter winding through which a variable current is provided by excitation controller 14 to increase or decrease the flux provided by stator exciter 22 to exciter armature winding 26. As a result, the output voltage of PMM 12 (provided at the output of main armature winding 24) can be regulated by controller 14 selectively increasing/decreasing the current supplied to stator exciter 22.

In other embodiments, PMM 12 is unregulated. For example, in this embodiment stator exciter 22 is implemented with a permanent magnet that provides a flux to exciter armature winding 26 that varies only with speed of rotating portion 18. In this embodiment, the voltage generated by exciter armature windings 26 increases with rotor speed. As a result, the current supplied to main field winding 34 increases with rotor speed. In one embodiment, as the current through main field winding 34 increases, the flux presented to main armature winding decreases, thereby providing automatic voltage regulation (i.e., voltage limiting) of the output provided by PMM 12.

Motoring Mode

The electrical energy converted to rotational energy by PMM 12 is a function of the AC current supplied to main armature winding 34 and the magnetic flux provided by hybrid permanent magnet rotor 32. Permanent magnet 36 provides a fixed magnitude magnetic flux, which is one of the reasons permanent magnet machines are so efficient over wound-field counterparts. However, it is not always desirable to maximize the flux presented to main armature winding 24. For example, at higher rotor speeds, the back electromotive force (BEMF) generated in main armature windings 24 offsets additional gains in speed that could be obtained by increasing the voltage supplied to main armature winding 24. In this case, decreasing the magnetic flux provided by hybrid PM rotor 32, in what is called field-weakening, allows the speed of rotating portion 20 to be further increased.

Once again, the voltage (and therefore the current) provided to main field winding 34 can either be regulated or unregulated. In one embodiment, the voltage provided to main field winding 34 is regulated by regulating the flux provided by stator exciter 22 to exciter armature winding 26, thereby regulating the voltage induced on exciter armature winding 26 and the voltage supplied, via rotating rectifier 28 and DC link bus 30 to main field exciter winding 34. In this embodiment, stator exciter 22 is implemented with a stator exciter winding through which a variable current is provided by excitation controller 14 to increase or decrease the flux provided by stator exciter 22 to exciter armature winding 26. As a result, the magnetic flux presented to main armature winding 24 can be regulated by controller 14 to selectively increase/decrease the current supplied to stator exciter 22.

In another embodiment, PMM 12 is unregulated. For example, in this embodiment stator exciter 22 is implemented with a permanent magnet that provides a flux to exciter armature winding 26 that only varies with speed of rotating portion 18. In this embodiment, the voltage generated by exciter armature windings 26 increases with rotor speed. As a result, the current supplied to main field winding 34 increases with rotor speed. In one embodiment discussed in more detail with respect to FIG. 1, as the current through main field winding 34 increases with increased rotor speed, the flux presented to main armature winding increases, thereby providing automatic field weakening at higher rotor speeds.

Figure 2:
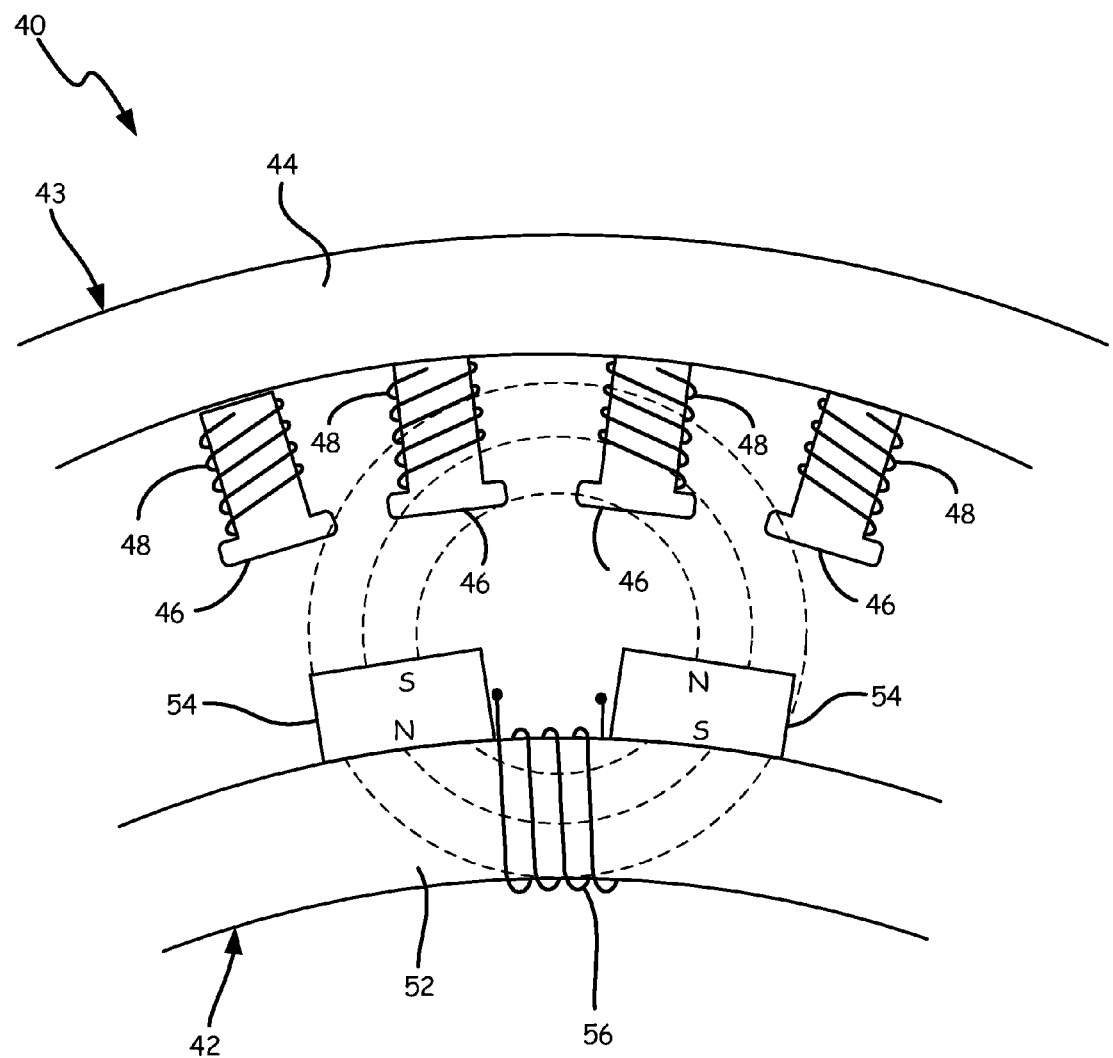
FIG. 2 is a cross-sectional view of flux-regulated PMM according to an embodiment of the present invention.

FIG. 2 is an end view of PMM 40 that illustrates the interaction between hybrid PMM rotor 42 and main armature winding 48. In the embodiment shown in FIG. 2, stationary portion 43 includes stator yoke 44, a plurality of poles 46, and main armature windings 48. Hybrid PMM rotor 42 includes rotor yoke 52, a plurality of permanent magnets 54, and main field winding 56. Voltage is developed in main armature windings 48 in response to changing magnetic flux presented by hybrid PMM rotor 42 in generating mode. Current supplied to main armature windings 48 generates a magnetic field that interacts with the magnetic flux presented by hybrid PMM rotor 42 to provide rotational energy to the rotor portion in the motoring mode.

In the embodiment shown in FIG. 2, rotor yoke 52 is comprised of a magnetically permeable material. Rotor yoke 52 may comprise a plurality of laminations stacked adjacent to one another in an axial direction (i.e., into the page), solid metal and/or powder metal pressed into the desired shape. The plurality of permanent magnets 54 are mounted to an exterior surface of rotor yoke 52 that is nearest to main armature winding 46. Magnetic flux flows between magnetic poles of opposite polarity. Rotor yoke 52 provides a magnetic circuit path through which magnetic flux is allowed to flow when no current is provided to main field winding 56. By increasing the current through main field winding 56, the laminations making up rotor yoke 52 become saturated and the magnetic flux that normally flows between adjacent permanent magnets 54 is prohibited from efficiently completing the magnetic circuit. As a result, when rotor yoke 52 is saturated, less magnetic flux is presented to main armature windings 48.

When PMM 40 is utilized in a generating mode, the output voltage generated by the plurality of main armature windings 48 is maximized when no current is provided to main field winding 56. Conversely, output voltage is reduced by increasing the current through main field winding 56 to saturate the laminations making up rotor yoke 52, thereby reducing the magnetic flux presented to main armature windings 46.

As discussed above with respect to FIG. 1, the current through main field winding 56 may be regulated or unregulated. When regulated, the current through main field winding 56 is controlled to selectively regulate the flux presented to main armature windings 48, thereby regulating the output voltage generated in main armature windings 48.

When PMM 40 is utilized in a motoring mode, the efficiency of the motor is maximized when no current is provided to main field winding 56. Therefore, during low-speed or starting operations, it will typically be desirable to not provide any current to main field winding 56. However, as the speed of PMM 40 increases, it may be desirable to implement field weakening by increasing the current through main field winding 56. In one embodiment, the current through main field winding 56 is automatically increased as the speed of PMM increases. As described in FIG. 1, stator exciter 22 may be implemented with permanent magnets that generate a voltage in exciter armature windings 26 (shown in FIG. 1) that increase with increasing speed of the PMM. In the context of FIG. 2, as the speed of PMM 40 increases, the voltage provided to main field winding 56 increases, thereby allowing current to develop in main field winding 56 that saturates rotor laminations making up rotor yoke 52. As a result, the magnetic flux presented to main armature windings 48 is decreased, providing automatic field weakening at higher rotor speeds.

Figure 3:
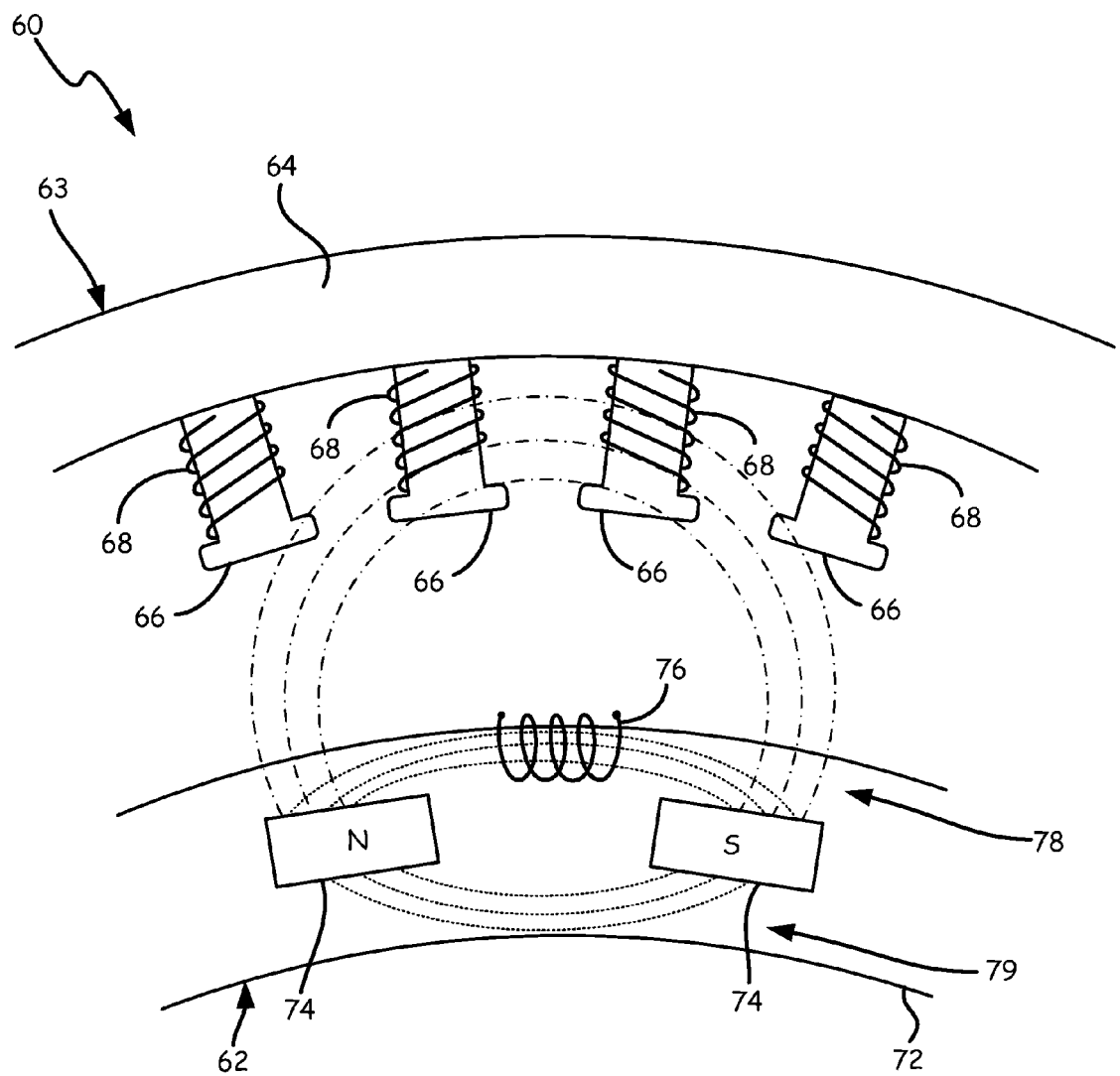
FIG. 3 is a cross-sectional view of flux-regulated PMM according to another embodiment of the present invention.

FIG. 3 is an end view of PMM 60 that illustrates the interaction between hybrid PMM rotor 62 and main armature winding 68. In the embodiment shown in FIG. 3, stationary portion 63 includes stator yoke 64, a plurality of poles 66, and main armature windings 68. Hybrid PMM rotor 62 includes rotor 72, a plurality of permanent magnets 74, and main field winding 76. Rotor 72 includes outer yoke portion 78 and inner yoke portion 79. Voltage is developed in main armature windings 68 in response to changing magnetic flux presented by hybrid PMM rotor 62 in generating mode. Current supplied to main armature windings 68 generates a magnetic field that interacts with the magnetic flux presented by hybrid PMM rotor 62 to provide rotational energy to the rotor portion in the motoring mode.

In the embodiment shown in FIG. 3, rotor 72 may once again be comprised of a plurality of laminations stacked adjacent to one another in an axial direction (i.e., into the page), of solid metal, and/or powdered metal. However, in contrast with the embodiment shown in FIG. 2 in which permanent magnets were surface mounted to an outer surface of the rotor yoke, in the embodiment shown in FIG. 3 permanent magnets 74 are embedded within rotor 72. For example, in the embodiment shown in FIG. 3, each rotor lamination may include a slot (not shown) through which permanent magnets 74 can be placed between outer yoke portion 78 and inner yoke portion 79. Similarly, rotor laminations 72 may include slots in outer yoke portion 78 for winding main field winding 76. In the embodiment shown in FIG. 3, main field winding 76 is wound around outer yoke 78, in the area between adjacent permanent magnets 74.

Magnetic flux flows between adjacent magnetic poles of opposite polarity. When no current is supplied to main field winding 76, magnetic flux is shorted within rotor 72 as indicated by dashed lines. For example, the magnetic circuit path between adjacent permanent magnets 74 is directed through outer yoke portion 78 and inner yoke portion 79. As a result, little or no magnetic flux is presented to main armature windings 68. By increasing the current through main field winding 76, the laminations making up rotor 72 become saturated and the magnetic flux that normally flows in a short-circuit path between adjacent permanent magnets 74 via outer yoke portion 78 is prohibited from efficiently completing the magnetic circuit. As a result, magnetic flux that normally flows in a short-circuit path within rotor 72 is forced across the air gap to main armature windings 68 as indicated by the dashed-dotted line.

When PMM 60 is utilized in a generating mode, the output voltage generated by the plurality of main armature windings 68 is maximized when current is provided to main field winding 76 to saturate the laminations making up rotor 72, resulting in magnetic flux being directed across the air gap to main armature windings 68. Conversely, output voltage is reduced by decreasing the current through main field winding 76 such that a magnetic short-circuit path exists within rotor 72 between adjacent permanent magnets 74. A benefit of this architecture is it provides fail-safe operation of PMM 60 in the generating mode, as voltage is developed in main armature windings 68 only when current is supplied main field winding 76. A fault that prevents the supply of current through main field winding 76 will not result in an uncontrolled output voltage of PMM 60.

As discussed above with respect to FIGS. 1 and 2, the current through main field winding 76 may be regulated or unregulated. When regulated, the current through main field winding 76 is controlled to selectively regulate the flux presented to main armature winding 68, thereby regulating the output voltage generated in PMM 60. When unregulated, the voltage developed by main armature windings 68 increases with increasing speed, and therefore increasing voltage supplied to main field winding 76.

When PMM 60 is utilized in a motoring mode, the efficiency of the motor is maximized when current is provided to main field winding 76. If no current is provided to main field winding 76, then little or no magnetic flux is presented to main armature windings and little or no rotational energy is provided to the rotor.

Figure 4:
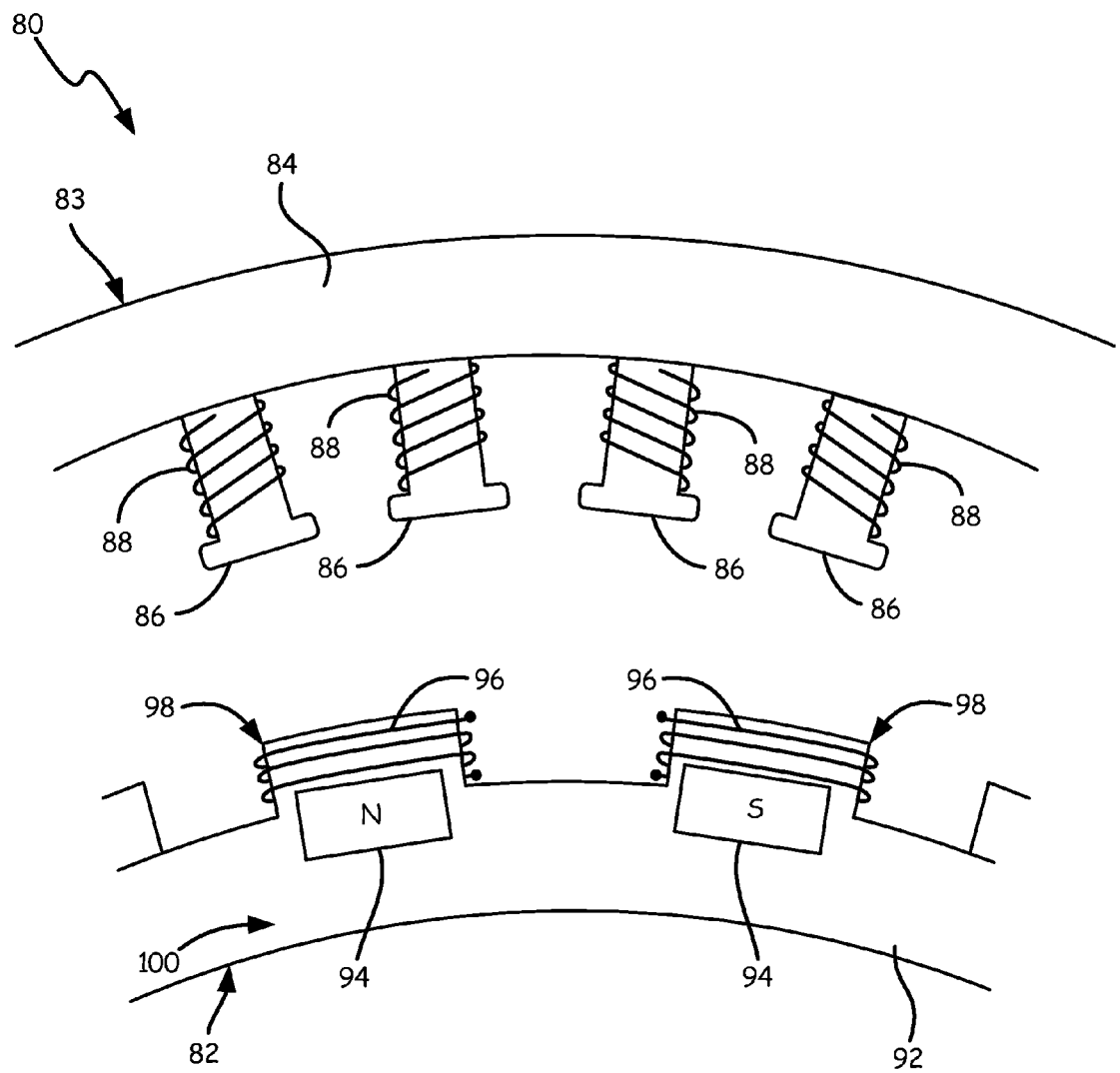
FIG. 4 is a cross-sectional view of flux-regulated PMM according to another embodiment of the present invention.

FIG. 4 is an end view of PMM 80 that illustrates the interaction between hybrid PMM rotor 82 and main armature winding 88. In the embodiment shown in FIG. 3, stationary portion 83 includes stator yoke 84, a plurality of poles 86, and main armature windings 88. Hybrid PMM rotor 82 includes rotor 92, a plurality of permanent magnets 94, and main field windings 96. Rotor 92 further includes a plurality of poles 98 extending radially outward from inner yoke portion 100. Voltage is developed in main armature windings 88 in response to changing magnetic flux presented by hybrid PMM rotor 82 in generating mode. Current supplied to main armature windings 88 generates a magnetic field that interacts with the magnetic flux presented by hybrid PMM rotor 82 to provide rotational energy to the rotor portion in the motoring mode.

In the embodiment shown in FIG. 4, rotor 92 once again is comprised of a plurality of laminations stacked adjacent to one another in an axial direction (i.e., into the page). However, in the embodiment shown in FIG. 4, rotor 92 includes a plurality of poles 98 that extend radially outward from rotor yoke 100. Each of the plurality of poles includes a permanent magnet and main field winding wound around a portion of the pole. In the embodiment shown in FIG. 4, permanent magnets 94 are embedded within each of the plurality of poles 98, and main field winding 96 is wound around a portion of each pole 96 that is radially outward from permanent magnets 94. However, in other embodiments, the plurality of permanent magnets 94 are surface mounted on the end of each of the plurality of poles 98, and main field winding 96 is wound around a portion of each pole 96 located radially interior of permanent magnets 94. In one embodiment rotor 92 is comprised of a plurality of laminations, wherein each lamination includes a slot or opening through which permanent magnets 94 are placed. Similarly, the laminations may include slots that allow main field windings 96 to be wound adjacent to and radially outward of permanent magnets 94. In other embodiments, rotor 92 is comprised of solid metal and/or powder metal.

In the embodiment shown in FIG. 4, main field winding 96 acts to augment magnetic flux presented to main armature windings 88. Magnetic flux provided by permanent magnets 94 flows between adjacent permanent magnets. The magnetic flux provided by permanent magnets 94 is augmented by magnetic flux provided by main field windings 96. Increasing current through main field winding 96 increases the magnetic flux presented to main armature windings 88. Decreasing current through main field winding 96 decreases the magnetic flux presented to main armature windings 88.

When PMM 80 is utilized in a generating mode, the output voltage generated by the plurality of main armature windings 88 is maximized when current is provided to main field winding 96 to augment the magnetic flux provided by permanent magnets 94. If no current is supplied to main field windings 96, then PMM 80 acts as a standard permanent magnet machine in which the output voltage generated by the plurality of main armature windings 88 is based on the magnetic flux provided by permanent magnets 94. If current is provided in an opposite direction through main field winding 96, the magnetic field created by main field winding 96 would oppose (buck) the magnetic field provided by the plurality of permanent magnets 94 and would therefore decrease the output voltage generated by the plurality of main armature windings 88. A benefit of this architecture is it decreases the amount of electrical current necessary to develop a nominal or minimum generator terminal voltage. That is, at least some of the magnetic flux required to generate a desired output voltage through main armature windings 88 is provided by permanent magnets 94. Additional power is supplied to main field windings 96 only as required to augment or increase the flux presented to main armature windings 88, while additional power provided in an opposite direction can be used to decrease the flux presented to main armature windings 88.

As discussed above with respect to other embodiments, the current through main field winding 96 may be regulated or unregulated. When regulated, the current through main field winding 96 is controlled to selectively regulate the flux presented to main armature winding 88, thereby regulating the output voltage generated in PMM 80. When unregulated, the voltage developed by main armature windings 88 increases with increasing speed, and therefore increasing voltage supplied to main field winding 96.

When PMM 80 is utilized in a motoring mode, the efficiency of the motor is maximized when current is provided to main field winding 96, thereby increasing the magnetic flux presented to main armature windings 88. In the embodiment shown in FIG. 4, magnetic flux is still presented to main armature windings 88 even if no current is provided to main field windings 96. However, the magnitude of the magnetic flux presented to main armature windings 88 is increased as additional current is supplied to main field windings 96.

Discussion of Possible Embodiments

The following are non-exclusive descriptions of possible embodiments of the present invention.

A flux-regulated permanent magnet machine (PMM) includes a stationary portion that includes armature windings, and a rotating portion that includes a plurality of permanent magnets and a control winding that is supplied with current to control magnetic flux presented to the armature windings.

The flux-regulated permanent magnet machine (PMM) of the preceding paragraph can optionally include, additionally and/or alternatively, any one or more of the following features, configurations and/or additional components:

The rotating portion may include a rotor, wherein the plurality of permanent magnets are surface mounted to an exterior, stator-facing portion of the rotor.

The control winding may be wrapped around the rotor between adjacent permanent magnets.

The flux presented to the armature windings may be increased by decreasing current through the control winding.

The flux presented to the armature windings may be decreased by increasing current through the control winding.

The rotating portion may include a rotor, wherein the plurality of permanent magnets may be embedded within the rotor, and wherein the control winding may be wrapped around an outer portion of the rotor between adjacent permanent magnets.

A short-circuit magnetic path may be provided between adjacent permanent magnets via the outer portion of the rotor.

The flux presented to the armature windings may be increased by increasing current through the control winding.

The flux presented to the armature windings may be decreased by decreasing current through the control winding.

The rotating portion may further include a ferromagnetic yoke and a plurality of poles extending from the ferromagnetic yoke towards the stator portion, wherein each of the plurality of poles may include one of the plurality of permanent magnets and the control winding.

Each of the plurality of permanent magnets may be surface mounted to an exterior, stator-facing portion of the rotor, and the control coil may be wound around each of the poles at a location radially inward of the plurality of permanent magnets.

Each of the plurality of permanent magnets may be embedded within the plurality of poles, and the control coil may be wound around each of the poles at a location radially outward of the plurality of permanent magnets.

The magnetic flux presented to the armature windings may increased by supplying a current to the control winding.

The magnet flux presented to the armature windings may be decreased by decreasing and/or reversing current supplied to the control winding.

A motor/generator includes a passive permanent magnet machine (PMM), a rotating rectifier, and a flux regulated machine. The passive PMM may include a stationary portion that includes a first plurality of permanent magnets and a rotating portion that includes a rotating exciter windings that develops an alternating current (AC) voltage in response to the first plurality of permanent magnets. The rotating rectifier rectifies the AC voltage developed in the rotating exciter windings to a direct current (DC) voltage. The flux-regulated permanent magnet machine (PMM) includes a stationary portion that includes stator armature windings and a rotating portion that includes a plurality of permanent magnets and a control winding that is selectively supplied with current to control magnetic flux presented to the stator armature windings.

The flux-regulated permanent magnet machine (PMM) of the preceding paragraph can optionally include, additionally and/or alternatively, any one or more of the following features, configurations and/or additional components:

The AC voltage developed in the rotating exciter windings may increase as speed of the motor/generator increases, wherein as the AC voltage developed in the rotating exciter winding increases, current supplied to the control winding may increase.

An increase in current in the control winding may counteract a back electromotive force (BEMF) generated by increased speed of the motor/generator.

A motor/generator includes a wound field exciter, a rotating rectifier, and a flux-regulated permanent magnet machine (PMM). The wound field exciter includes a stationary portion that includes an exciter field winding and a rotating portion that includes rotating exciter windings that develop an alternating current (AC) voltage in response to the excitation provided by the exciter field winding. The rotating rectifier rectifies the AC voltage developed in the rotating exciter windings to a direct current (DC) voltage. The flux-regulated permanent magnet machine (PMM) includes a stationary portion that includes stator armature windings and a rotating portion that includes a plurality of permanent magnets and a control winding connected to receive the DC voltage developed by the rotating rectifier.

The motor/generator of the preceding paragraph can optionally include, additionally and/or alternatively, any one or more of the following features, configurations and/or additional components:

The rotating portion of the flux-regulated PMM includes a rotor, wherein the plurality of permanent magnets are embedded within the rotor, and wherein the control winding is wrapped around an outer portion of the rotor between adjacent permanent magnets.

A short-circuit magnetic path may be provided between adjacent permanent magnets via the outer portion of the rotor.

The flux presented to the stator armature windings may be increased by increasing current through the control winding.

The flux presented to the stator armature windings may be decreased by decreasing current through the control winding.

The rotating portion may further include a ferromagnetic yoke and a plurality of poles extending from the ferromagnetic yoke towards the stator portion, wherein the control winding may be wrapped around the plurality of poles and wherein each of the plurality of poles may include one of the plurality of permanent magnets.

Each of the plurality of permanent magnets may be surface mounted to an exterior, stator-facing portion of the rotor, and the control coil may be wound around each of the poles at a location radially inward of the plurality of permanent magnets.

Each of the plurality of permanent magnets may be embedded within the plurality of poles, and the control coil is wound around each of the poles at a location radially outward of the plurality of permanent magnets.

The magnetic flux presented to the stator armature windings may be increased by supplying a current to the control winding.

The magnet flux presented to the stator armature windings may be decreased by decreasing current supplied to the control winding.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A permanent magnet machine comprising:
   an excitation controller;
   a wound field stator exciter configured to receive a control current from the excitation controller;
   stator armature windings;
   rotating exciter windings that develop an alternating current (AC) voltage in response to excitation provided by the wound field stator exciter;
   a rotating rectifier that rectifies the AC voltage developed in the rotating exciter windings to a direct current (DC) voltage;
   a control winding configured to receive winding current using the DC voltage; and
   rotating permanent magnets embedded within a ferromagnetic yoke;
   wherein the rotating permanent magnets are configured such that magnetic flux of the rotating permanent magnets flows through the ferromagnetic yoke and is only received by the stator armature windings when the winding current is received by the control winding;
   wherein the control winding is configured to saturate the ferromagnetic yoke to direct the magnetic flux of the rotating permanent magnets to the stator armature windings when the control current is received by the control winding.

2. The permanent magnet machine of claim 1, wherein the excitation controller is configured to increase the magnetic flux of the rotating permanent magnets presented to the stator armature windings by increasing the control current to increase the winding current through the control winding.

3. The permanent magnet machine of claim 1, wherein the excitation controller is configured to decrease the magnetic flux of the rotating permanent magnets presented to the stator armature windings by decreasing the control current to decrease the winding current through the control winding.

4. The permanent magnet machine of claim 1, wherein the control winding is configured to saturate the ferromagnetic yoke to direct the magnetic flux of the rotating permanent magnets to the stator armature windings when the winding current is received by the control winding.

5. A permanent magnet machine comprising:
   a stator exciter that includes at least one exciter permanent magnet;
   stator armature windings;
   rotating exciter windings that are magnetically coupled to the at least one exciter permanent magnet;
   a rotating rectifier that rectifies alternating current (AC) voltage developed in the rotating exciter windings to a direct current (DC) voltage;
   a control winding configured to receive control current using the DC voltage; and
   rotating permanent magnets embedded within a ferromagnetic yoke;
   wherein the rotating permanent magnets are configured such that magnetic flux of the rotating permanent magnets flows through the ferromagnetic yoke and is only received by the stator armature windings when the control current is received by the control winding.

6. The permanent magnet machine of claim 5, wherein the control winding is configured to saturate the ferromagnetic yoke to direct the magnetic flux of the rotating permanent magnets to the stator armature windings when the control current is received by the control winding.

7. A flux-regulated permanent magnet machine (PMM) comprising:
   a stationary portion that includes stator armature windings and a stator exciter; and
   a rotating portion comprising:
      exciter armature windings magnetically coupled with the stator exciter;
      a ferromagnetic yoke;
      a plurality of permanent magnets embedded within the ferromagnetic yoke; and
      a control winding configured to receive excitation current from the exciter armature windings;
      wherein the plurality of permanent magnets are configured such that magnetic flux of the plurality of permanent magnets flows through the ferromagnetic yoke and is only received by the stator armature windings when the excitation current is received by the control winding.

8. The flux-regulated PMM of claim 7, further comprising a controller configured to control the excitation current provided to the control winding, wherein the magnetic flux of the plurality of permanent magnets presented to the stator armature windings is increased by increasing the excitation current through the control winding.

9. The flux-regulated PMM of claim 7, further comprising a controller configured to control the excitation current provided to the control winding, wherein the magnetic flux of the plurality of permanent magnets presented to the stator armature windings is decreased by decreasing the excitation current through the control winding.

10. The flux-regulated PMM of claim 7, wherein the control winding is configured to saturate the ferromagnetic yoke to direct the magnetic flux of the plurality of permanent magnets to the stator armature windings when the excitation current is received by the control winding.

* * * * *